(12) United States Patent
Baldassarre et al.

(10) Patent No.: US 10,677,255 B2
(45) Date of Patent: Jun. 9, 2020

(54) DRY GAS SEAL COOLING ARRANGEMENT AND METHOD

(71) Applicant: Nuovo Pignone Tecnologie Srl, Florence (IT)

(72) Inventors: Leonardo Baldassarre, Florence (IT); Andrea Cianti, Florence (IT); Simone Amidei, Florence (IT); Alberto Armenzani, Florence (IT); Emanuele Rizzo, Florence (IT)

(73) Assignee: NUOVO PIGNONE SRL, Florence (IT)

( * ) Notice: Subject to any disclaimer, the term of this patent is extended or adjusted under 35 U.S.C. 154(b) by 70 days.

(21) Appl. No.: 15/748,661

(22) PCT Filed: Jul. 28, 2016

(86) PCT No.: PCT/EP2016/068086
§ 371 (c)(1),
(2) Date: Jan. 30, 2018

(87) PCT Pub. No.: WO2017/017227
PCT Pub. Date: Feb. 2, 2017

(65) Prior Publication Data
US 2019/0003481 A1 Jan. 3, 2019

(30) Foreign Application Priority Data
Jul. 30, 2015 (IT) .................. 102015000040380

(51) Int. Cl.
F04D 29/12 (2006.01)
F04D 29/10 (2006.01)
(Continued)

(52) U.S. Cl.
CPC ............ F04D 29/124 (2013.01); F01D 11/04 (2013.01); F01D 25/125 (2013.01); F01D 25/22 (2013.01);
(Continued)

(58) Field of Classification Search
CPC .... F04D 29/124; F04D 29/122; F04D 29/102; F04D 29/104; F04D 29/584;
(Continued)

(56) References Cited

U.S. PATENT DOCUMENTS 5,054,583 A * 10/1991 Wrzyszczynski ..... F01D 25/125
184/104.1
8,814,508 B2 8/2014 Puggioni et al.
(Continued)

FOREIGN PATENT DOCUMENTS

GB 861557 A 2/1961

OTHER PUBLICATIONS

Search Report and Written Opinion issued in connection with corresponding IT Application No. 102015000040380 dated Apr. 7, 2016.
(Continued)

*Primary Examiner* — Ninh H. Nguyen
*Assistant Examiner* — Behnoush Haghighian
(74) *Attorney, Agent, or Firm* — Baker Hughes Patent Organization

(57) ABSTRACT

The shaft seal arrangement for a rotating turbomachine shaft having a rotation axis, comprises a rotor part and a stationary part. A dry gas seal is further provided, in combination with a cooling fluid volume arranged for receiving a cooling fluid and in heat exchange relationship with the dry gas seal. A venting arrangement collectively vents exhaust cooling fluid and dry sealing gas from the shaft seal arrangement.

18 Claims, 3 Drawing Sheets

(51) Int. Cl.
*F16J 15/34* (2006.01)
*F16J 15/40* (2006.01)
*F01D 25/22* (2006.01)
*F01D 25/12* (2006.01)
*F04D 29/58* (2006.01)
*F01D 11/04* (2006.01)
*F01D 11/00* (2006.01)

(52) U.S. Cl.
CPC ......... *F04D 29/104* (2013.01); *F04D 29/584* (2013.01); *F16J 15/3404* (2013.01); *F16J 15/3484* (2013.01); *F16J 15/406* (2013.01); *F01D 11/003* (2013.01); *F04D 29/102* (2013.01); *F04D 29/122* (2013.01); *F04D 29/5826* (2013.01); *F05B 2240/57* (2013.01); *F05D 2240/55* (2013.01); *F16J 15/344* (2013.01); *F16J 15/3436* (2013.01); *F16J 15/3452* (2013.01)

(58) Field of Classification Search
CPC .... F04D 29/5826; F01D 11/003; F01D 11/04; F01D 25/125; F01D 25/22; F05B 2260/602; F05B 2260/603; F05B 2260/64; F05B 2240/57; F05D 2240/55; F05D 2260/602; F05D 2260/6022; F05D 2260/605; F05D 2260/608; F16J 15/3404; F16J 15/3484; F16J 15/406; F16J 15/34; F16J 15/3436; F16J 15/344; F16J 15/3452

USPC ........ 415/112; 277/408, 358, 361, 369, 377, 277/379

See application file for complete search history.

(56) References Cited

U.S. PATENT DOCUMENTS

| | | | | |
|---|---|---|---|---|
| 9,791,046 | B2* | 10/2017 | Hori | F16J 15/40 |
| 10,035,096 | B2* | 7/2018 | Deckman | B01D 53/04 |
| 10,100,932 | B2* | 10/2018 | Devitt | F16J 15/342 |
| 2005/0147517 | A1 | 7/2005 | Dreifert et al. | |
| 2013/0170961 | A1* | 7/2013 | Meucci | F01D 25/22 |
| | | | | 415/170.1 |
| 2014/0161587 | A1* | 6/2014 | Shamseldin | F04D 29/124 |
| | | | | 415/1 |
| 2015/0118018 | A1* | 4/2015 | Baldassarre | F16J 15/3484 |
| | | | | 415/1 |
| 2015/0330261 | A1* | 11/2015 | Held | F01D 11/003 |
| | | | | 60/326 |

OTHER PUBLICATIONS

International Search Report and Written Opinion issued in connection with corresponding PCT Application No. PCT/EP2016/068086 dated Oct. 17, 2016.

International Preliminary Report on Patentability issued in connection with corresponding PCT Application No. PCT/EP2016/068086 dated Jan. 30, 2018.

* cited by examiner

DRY GAS SEAL COOLING ARRANGEMENT AND METHOD

FIELD OF THE INVENTION

The disclosure in general relates to shaft seal arrangements. Embodiments disclosed herein specifically relate to shaft seal arrangements for rotating turbomachine shafts, including at least on dry gas seal. The disclosure further relates to systems comprising a turbomachine with a rotating shaft and a shaft seal arrangement including a dry gas seal, as well as methods for shaft seal cooling.

BACKGROUND OF THE INVENTION

Rotating turbomachine shafts are usually supported by means of bearings in a stationary casing. Seals are provided to prevent leakage of working fluid from a high pressure side to a low pressure side of the shaft. Recently, dry gas seals have been developed, which provide enhanced sealing against fluid leakages along the rotating shaft.

Dry gas seals are increasingly used as shaft seals in turbomachines, for example in centrifugal compressors, since they offer several advantages over other sealing arrangements. Dry gas seals as understood herein are shaft seals which have at least two sealing elements, herein referred to as sealing rings, which extend around the shaft in a circumferential direction, i.e. around the rotation axis of the shaft. One sealing ring is mounted for co-rotation with the shaft, while the other sealing ring is mounted stationary in the casing. Each sealing ring comprises a respective sealing surface pointing towards the oppositely arranged sealing ring. The stationary sealing ring and the rotating sealing ring are resiliently biased against each other and co-act at the sealing surfaces thereof. A pressurized dry gas is delivered between the sealing surfaces, such that a contactless sealing effect is obtained between the opposing sealing surfaces of the stationary and rotary sealing rings.

Dry gas seals are typically employed in centrifugal compressors. In some applications, heating arrangements are required, to prevent high molecular weight components of the seal gas from condensing, since the dry gas seals must be free of liquid to operate correctly. In other embodiments, heat removal arrangements have been developed, in order to prevent excessive heat built-up in the dry gas seals. Cooled dry gas seals are disclosed for instance in U.S. Pat. No. 8,814,508. A heat exchanger developing around the stationary sealing ring and the rotating sealing ring is provided. A liquid circulates in the heat exchanger to remove heat from the dry gas seal. This known dry seal arrangement operates satisfactorily, but is to some extent complex and cumbersome.

Therefore, there is still a need of improving shaft seal arrangements including dry gas seals, to provide safe, cost-effective and efficient seal arrangements, in particular in those applications where heat removal from the dry gas seal may become important.

SUMMARY OF THE INVENTION

According to one aspect a shaft seal arrangement for a rotating turbomachine shaft having a rotation axis is disclosed. The shaft seal arrangement can comprise a rotor part that rotates during operation and a stationary part. According to embodiments disclosed herein, the shaft seal arrangement includes a dry gas seal. The dry gas seal can in turn include: at least one rotary element, e.g. a rotary ring, having a rotary sealing surface and arranged for rotation with the rotor part; and at least one stationary element, e.g. in the shape of a rotary ring, in a fixed relationship with the stationary part and having a stationary sealing surface. The rotary sealing surface and the stationary sealing surface are resiliently biased one against the other. A dry gas delivery path is further provided, configured for delivering dry sealing gas between the stationary sealing surface and the rotary sealing surface. Furthermore, the shaft seal arrangement can further include at least one cooling fluid volume arranged for receiving a cooling fluid and in heat exchange relationship with the dry gas seal, and a venting arrangement, configured for collectively venting exhaust cooling fluid and dry sealing gas from the shaft seal arrangement.

According to a further aspect, disclosed herein is a turbomachine arrangement comprising a turbomachine comprised of a casing and a shaft arranged for rotation in the casing, whereon a rotary member is mounted for co-rotation with the shaft. A working fluid is processed through the turbomachine and a shaft seal arrangement as set forth above can be used to prevent working fluid leakages along the shaft. A cooling fluid source, fluidly coupled to a shaft seal arrangement, delivers cooling fluid thereto.

In embodiments disclosed herein the cooling fluid is working fluid processed by the turbomachine, or a fluid compatible therewith. A fluid compatible with the working fluid processed by the turbomachine is in general terms a fluid which does not adversely affect the safety or operation of the turbomachine in the short term, or else a fluid which does not contaminate the working fluid and can possibly be easily separated therefrom According to yet a further aspect, a power conversion system is disclosed, comprising a working fluid circuit having a high pressure side and a low pressure side and configured to flow a working fluid therethrough. The system can further include a cooler arranged and configured to remove heat from the working fluid in the low pressure side of the working fluid circuit and a pump or compressor fluidly coupled to the working fluid circuit between the low pressure side and the high pressure side thereof, configured to rise the pressure of the working fluid in the working fluid circuit. The system can further include a heat exchanger configured to circulate the working fluid in heat exchange relationship with a hot fluid, to vaporize the working fluid and a turboexpander fluidly coupled to the working fluid circuit and disposed between the high pressure side and the low pressure side thereof, configured to expand working fluid flowing therethrough and generating mechanical power therewith. The turboexpander comprises: a casing; a shaft arranged for rotation in the casing; an impeller mounted on the shaft for rotation therewith; a shaft seal arrangement as set forth herein above, for sealingly co-act with the shaft of the turboexpander.

Also disclosed herein is a method of cooling a shaft seal arrangement for a rotating shaft of a turbomachine fluidly coupled to a working fluid circuit, the shaft seal arrangement comprising a dry gas seal; the method comprising the steps of:

processing a working fluid through the turbomachine;
delivering a dry sealing gas to the dry gas seal;
delivering a cooling fluid to the shaft seal arrangement;
collectively venting exhaust cooling fluid and dry sealing gas from the shaft seal arrangement. The vented cooling fluid and sealing gas can be returned to a working fluid circuit.

The turbomachine can be a turboexpander, where through the working fluid is expanded from a high pressure to a low pressure. The method can further comprise the steps of:

cooling expanded working fluid from the turboexpander;

increasing the pressure of the cooled working fluid from the low pressure to the high pressure;

heating and vaporizing the compressed fluid;

delivering the vaporized working fluid to the turboexpander;

diverting a side flow of working fluid towards the shaft seal arrangement;

returning exhaust cooling fluid and dry sealing gas from the shaft seal arrangement to the circuit.

The vaporized working fluid can be optionally superheated fluid.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION

Shaft seal arrangements disclosed herein can be employed in a broad range of applications, whenever dry gas seals can be used as effective sealing means on rotating shafts, and heat removal from the dry gas seal becomes an important factor for an efficient operation of the shaft seal arrangement.

In an embodiment of the shaft seal arrangements disclosed herein are in combination with turbomachines where high temperature gases are processed, e.g. centrifugal compressors and turboexpanders.

Herein after reference will be made to a power system including a turboexpander, comprised of a shaft seal arrangement according to the present disclosure. The embodiment disclosed herein shall, however, not be considered as limiting the scope of the present disclosure and of the invention as set forth in the attached claims. Other advantageous applications of shaft seal arrangements can be in other turboexpanders, or else in different rotary turbomachines, such as axial and centrifugal compressors, for instance.

Figure 1:
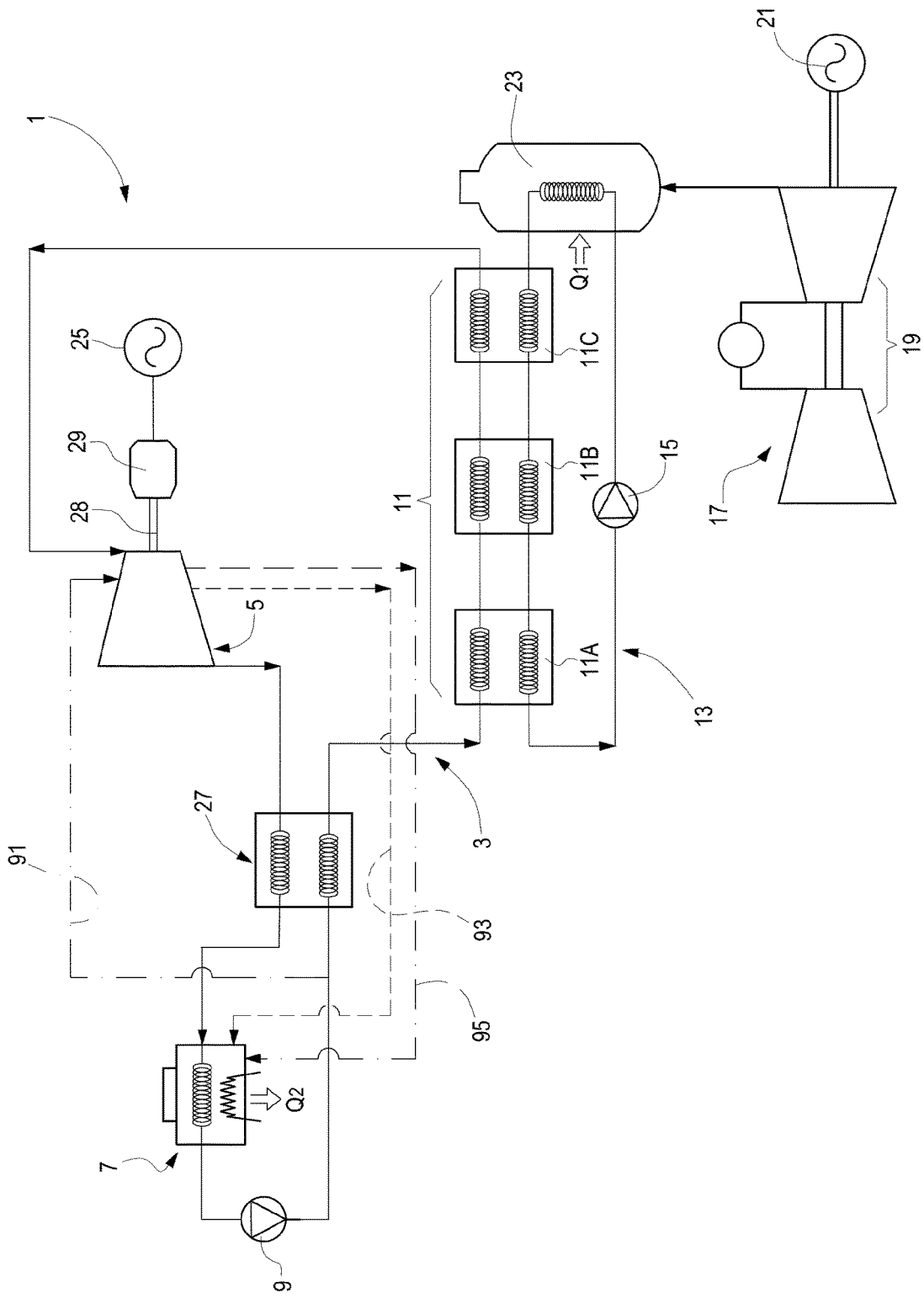
FIG. 1 illustrates a schematic of a power system including a turboexpander, which can embody a shaft seal arrangement according to the present disclosure.

In FIG. 1 a power system, globally designated 1 is illustrated, which can use for instance an organic Rankine thermodynamic cycle for producing useful mechanical power. Other thermodynamic cycles can be used as an alternative to an organic Rankine cycle.

The power system 1 comprises a working fluid circuit 3, in which a working fluid circulates and is subject to cyclic thermodynamic transformations, to convert thermal power (heat) into mechanical power. In some embodiments the working fluid can be an organic fluid, such as pentane, cyclopentane, toluene and the like. The working fluid can also be carbon dioxide ($CO_2$), Genetron 245FA (R245FA) or the like. In the working fluid circuit 3 the working fluid can perform a known thermodynamic cycle, absorbing heat from a high-temperature heat source, and discharging heat at a low-temperature heat sink.

In the exemplary embodiment of FIG. 1 the working fluid circuit 3 comprises a turboexpander 5, a condenser or cooler 7, a pump 9 and a heat exchanger 11. The heat exchanger 11 can in turn include a heater 11A, an evaporator 11B and a superheater 11C. The working fluid, e.g. cyclopentane, circulating in the working fluid circuit 3 is heated in the heater 11A, vaporized in the evaporator 11B and finally superheated in the superheater 11C.

In other embodiments the heat exchanger can include a single apparatus, where the change of status is performed in a single step, for instance if in at least a portion of the working fluid circuit 3 the working fluid is in a supercritical state.

In some embodiments, e.g. if $CO_2$ is used as a working fluid in a supercritical cycle, the pump 9 can be replaced by a compressor. In general terms, the machine 9 is a turbomachine designed and configured for increasing the working fluid pressure from a low pressure to a high pressure.

The working fluid circuit 3 is divided into a high pressure side and a low pressure side. The high pressure side extends from the delivery side of the pump 9 to the inlet of the turboexpander 5. The low pressure side extends from the delivery side of the turboexpander 5 to the suction side of the pump 9.

In the exemplary embodiment of FIG. 1, the heat exchanger 11 is in thermal exchange relationship with a heat transfer fluid, e.g. oil or the like, circulating in an intermediate heat transfer loop 13. A pump 15 can circulate the heat transfer fluid in the intermediate heat transfer loop 13. Heat is received by the heat transfer fluid from a suitable heat source. In the exemplary embodiment of FIG. 1 the heat source comprises a top, high temperature thermodynamic cycle 17, including e.g. a gas turbine engine 19, which can be used to drive an electric generator 21. Exhaust combustion gas from the gas turbine engine 19 exchanges high-temperature heat $Q1$ in a waste heat recovery exchanger 23 against heat transfer fluid circulating in the heat transfer loop 13. The heat $Q1$ is then transferred through the heat exchanger 11 to the working fluid circulating in the working fluid circuit 3.

High-pressure, heated working fluid from the heat exchanger 11 expands in the turboexpander 5, generating mechanical power, which is made available on an output shaft 28, drivingly connected, e.g. directly or through a gear box 29, to an electric generator 25, or to any other suitable mechanical load.

Exhaust working fluid at low pressure discharged from the turboexpander 5 is cooled and condensed in the condenser 7, where low-temperature heat $Q2$ is discharged to a heat sink, e.g. a flow of water or air.

Condensed, working fluid is then pumped by pump 9 from the low pressure of the condenser 7 to the high pressure of the heat exchanger 11.

The working fluid circuit 3 can further include a recuperator 27, wherein exhaust working fluid discharged from the turboexpander 5 exchanges heat against cold, liquefied and pressurized working fluid delivered by the pump 9.

The turboexpander 5 can include a rotating shaft, whereon at least one impeller is mounted for co-rotation with the shaft. The shaft and the impeller are arranged for rotation in a casing. At least a shaft seal arrangement is located in the casing for preventing leakage of working fluid from the casing of the turboexpander 5 to the environment. An exemplary shaft seal arrangement for use in the turboexpander 5 is shown in FIG. 2 and will be described in greater detail herein after.

The shaft seal arrangement can include a dry gas seal, and additional shaft seal components, and can be provided with a cooling arrangement, to remove heat from the dry gas seal and protect heat-sensitive components of the shaft seal arrangement against deterioration due to over-temperature.

In some embodiments, as will be described with reference to FIG. 2, the cooling arrangement uses liquid cooling fluid, and more specifically liquefied working fluid to remove heat from the shaft seal arrangement. The liquid cooling fluid is at least partly evaporated, such that latent evaporation heat is effectively removed from the shaft seal arrangement. Residual cooling liquid is drained through a drainage arrangement, and evaporated cooling fluid is vented together and cumulatively with dry sealing gas from the dry gas seal. The exhaust cooling fluid is returned to the working fluid circuit 3, along with the dry sealing gas from the dry gas seal, which can be separated from the working fluid in a non-condensable gas separator.

Figure 2:
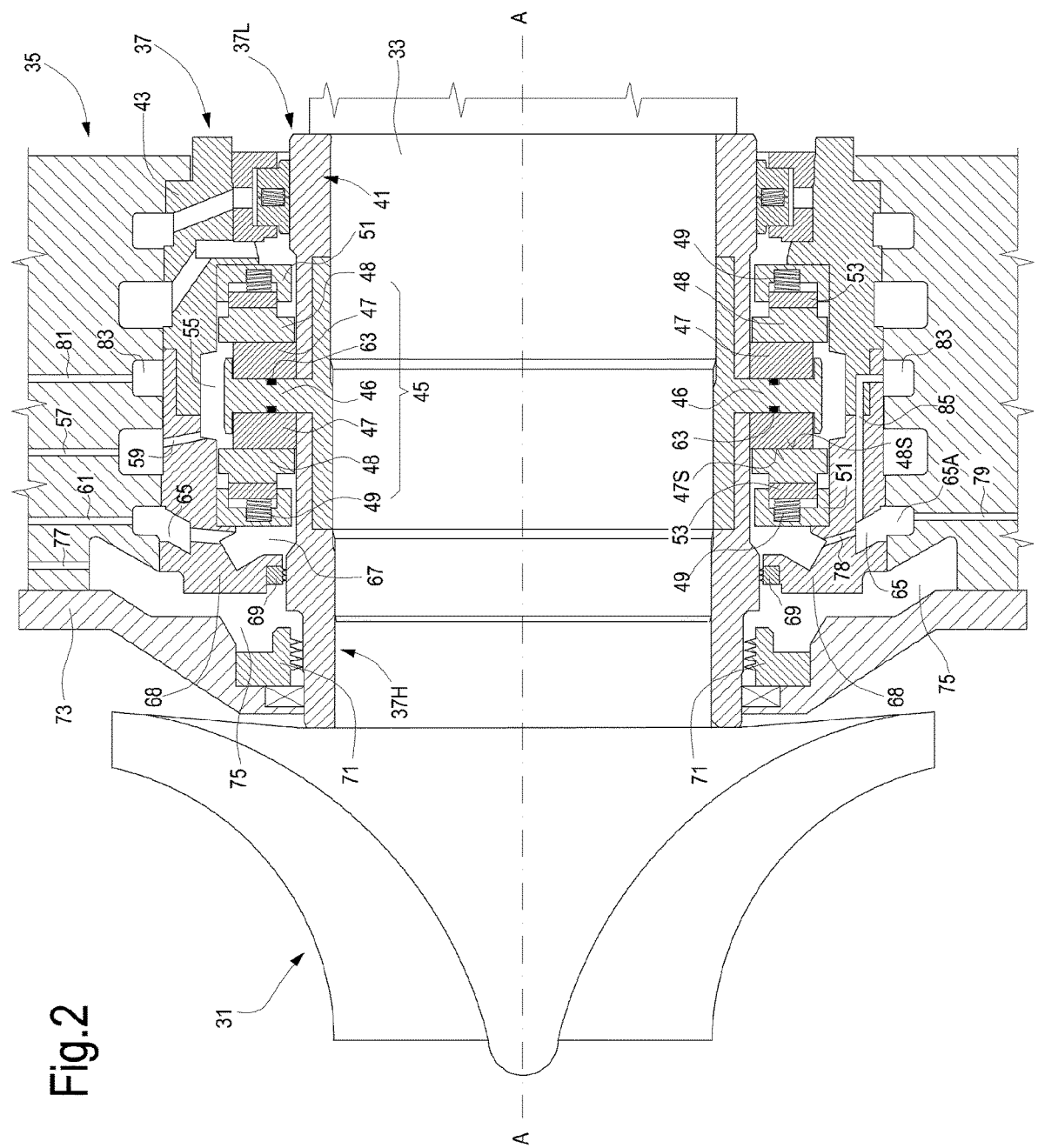
FIG. 2 illustrates a shaft seal arrangement, including a dry gas seal, according to an exemplary embodiment.

Referring now to FIG. 2, a sectional view of the impeller 31 of the turboexpander 5 is shown, along with a portion of the rotating shaft 33, whereon the impeller 31 is mounted for co-rotation therewith around a rotation axis A-A. The impeller 31 and the rotating shaft 33 are mounted in a turboexpander casing 35.

In the exemplary embodiment of FIG. 2 the impeller 31 is mounted on the rotating shaft 33 in an overhanging manner, such that a single bearing (not shown) can be used to support the rotating shaft 33. In other embodiments, an in-between-bearings impeller arrangement can be used, wherein one or more impellers are mounted on a shaft supported at two opposite ends by two bearings. A shaft seal arrangement can be provided between the impeller and each bearing supporting the rotating shaft 33.

In the embodiment of FIG. 2 a shaft seal arrangement 37 is arranged around the rotating shaft 33, between the impeller 31 and a shaft supporting bearing, not shown arranged opposite the impeller 31.

The shaft seal arrangement 37 has a high-pressure, high temperature side 37H at a first axial end thereof, facing the impeller 31, and a low-pressure, low temperature side 37L at second axial end thereof, facing the shaft supporting bearing (not shown).

The shaft seal arrangement 37 can comprise a rotor part 41 that rotates together with the rotating shaft 33 and the impeller 31 during operation of the turboexpander 5. The shaft seal arrangement 37 further comprises a stationary part 43, which is stationarily mounted in the casing 35 of the turboexpander 5.

The shaft seal arrangement 37 further comprises a dry gas seal, globally labeled 45. In the exemplary embodiment of FIG. 2 the dry gas seal 45 is a double, face-to-face dry gas seal. In other embodiments, a single dry gas seal, a tandem dry gas seal, or combinations thereof can be used instead.

The dry gas seal 45 comprises a main sleeve 46 on the rotary part 41. Two opposite rotating elements 47 are mounted in a face-to-face relationship on the main sleeve 46 and rotate therewith. The rotating elements 47 can be in the form of rings and herein below they will be referred to as rotating rings.

Each rotating ring 47 has a respective sealing surface 47S facing away from the main sleeve 46. Two opposite stationary elements 48 are arranged on the stationary part 43 of the shaft sealing arrangement 37, i.e. in a fixed relationship with the stationary part 43, and in a face-to-face relationship with the respective rotating ring 47. The stationary elements 48 can be in the shape of rings and will herein below they will be referred to as stationary rings 48. Each stationary ring 48 has a sealing surface 48S, opposing the sealing surface 47S of the corresponding rotating ring 47.

Each stationary ring 48 is resiliently biased by springs 49 against the respective rotating ring 47, such that the sealing surfaces 47S and 48S are pressed against each other. The springs can be arranged between a stationarily mounted retainer 51 and an intermediate pressure ring 53, arranged between the springs 49 and the respective stationary ring 48, to avoid direct contact between the springs 49 and the stationary ring 48.

The rotating rings 47 and the main sleeve 46 can be surrounded by an annular dry gas collector chamber 55, which is fluidly coupled to a dry gas delivery port 57 through a dry gas passage 59 formed in the stationary part 43 of the shaft seal arrangement. The dry gas delivery port 57 can in turn be fluidly coupled to a dry sealing gas source, e.g. a source of nitrogen or other suitable inert, pressurized dry sealing gas. Pressurized dry sealing gas is delivered between the opposing sealing surfaces 47S, 48S, such that a film of dry sealing gas is formed therebetween, while the shaft 33 and the impeller 31 rotate around the axis A-A.

In order to protect the dry gas seal 45 from damages due to over-temperature, the shaft seal arrangement 37 comprises a cooling arrangement described herein below. In particular, over-temperature damages can occur at gaskets 63 located between the main sleeve 46 and the rotary rings 47.

According to some embodiments, to remove heat from the dry gas seal, and prevent temperature damages from occurring, one or more cooling liquid ports 61 can be provided in the casing 35. The cooling liquid ports 61 can be arranged to deliver a cooling liquid to an annular groove 65 formed in the outer surface of the stationary part 43 of the shaft seal arrangement 37. The groove 65 can in turn be in fluid communication with a cooling fluid volume in heat exchange relationship with the dry gas seal 45. In the exemplary embodiment of FIG. 2, the cooling fluid volume comprises an annular cooling liquid chamber 67, which can extend around the rotation axis A-A of the shaft 33 and is located between the stationary part 43 and the rotor part 41 of the shaft seal arrangement 37. The annular cooling liquid chamber 67 can be located near the dry gas seal 45 between this latter and the high-pressure, high-temperature axial end 37H of the shaft seal arrangement and is in heat exchange relationship with the dry gas seal 45.

In the exemplary embodiment of FIG. 2, the annular cooling liquid chamber 67 is located between the retainer 51 and a flange 68 of the stationary part 43, which projects radially inwardly towards the rotation axis A-A.

A first additional shaft seal 69 can be provided between the rotor part 41 of the shaft seal arrangement 37 and the flange 68. The first additional shaft seal 69 can be a labyrinth seal.

A second additional shaft seal 71 can further be provided between the rotor part 41 of the shaft seal arrangement 37 and a cover 73. The dry gas seal 45, the first additional shaft seal 69 and the second additional shaft 71 are thus sequentially arranged in an axial direction along the rotation axis A-A.

At least partial evaporation of the cooling liquid delivered to the cooling liquid chamber 67 occurs due to heat absorption from the shaft seal arrangement 37. A vapor venting arrangement is provided, to remove vaporized cooling liquid from the shaft seal arrangement 37. According to some embodiments, the vapor venting arrangement comprises an annular vapor venting chamber 75 located between the first additional shaft seal 69 and the second additional shaft seal 71. At least one venting port 77 in fluid communication with the annular vapor venting chamber 75 can be provided in the upper portion of the annular vapor venting chamber 75, where through vaporized cooling liquid is removed.

A cooling fluid port 78 and a liquid drainage port 79 can be provided in the lower part of a groove 65A formed in the casing 35 and surrounding the groove 65. The groove 65A and the drainage port 79 form a cooling liquid drainage arrangement wherefrom non-vaporized, cooling liquid can be drained and removed from the shaft seal arrangement 37.

One or more additional cooling liquid ports 81 can be provided in the casing 35, in fluid communication with a cooling liquid chamber, forming an external cooling liquid chamber 83 surrounding the dry gas seal 45. The external cooling liquid chamber forms an additional cooling fluid volume, arranged and configured for receiving cooling fluid and in heat exchange relationship with the dry gas seal 45. In the lower portion of the shaft seal arrangement 37 the external cooling liquid chamber 83 can be fluidly coupled to the groove 65A through one or more ports 85, such that cooling liquid present in the lower part of the external cooling liquid chamber 83 can be removed through the drainage port 79.

The cooling liquid delivered to the annular cooling liquid chamber 67 and to the external cooling liquid chamber 83 can be pressurized, condensed working fluid from the working fluid circuit 3. In FIG. 1 a cooling liquid delivery duct 91 connects the high pressure side of the working fluid circuit 3, between the pump 9 and the recuperator 27, to the shaft seal arrangement 37 of the turboexpander 5. A flow of cold, liquefied and pressurized working fluid from the pump 9 is delivered through the cooling liquid delivery duct 91 to the cooling liquid ports 61 and 81.

Vaporized cooling liquid collected from the vapor venting chamber 75 is returned to the low pressure side of the working fluid circuit 3 through a vapor venting line 93. For instance the venting line 93 can return the vaporized cooling liquid to the vapor side of the condenser 7. Non-vaporized cooling liquid which is collected at the lower side of the groove 65A can be returned through a drainage line 95 to the liquid side of the condenser 7.

Dry sealing gas leaking from the dry gas seal 45 through the annular cooling liquid chamber 67 is collected, together with the vaporized cooling liquid in the vapor venting chamber 75 and vented along with the vaporized cooling liquid towards the condenser 7.

The shaft seal arrangement 37 operates as follows. When the turboexpander 5 is in operation, the shaft 33 and the impeller 31 rotate in casing 35. Working fluid is processed in the working fluid circuit 3 to convert part of the thermal power from the exhaust combustion gas of the gas turbine engine 17 into useful mechanical power.

Heat is removed from the shaft seal arrangement 37, and specifically from the dry gas seal 45 thereof, by circulating condensed and pressurized working fluid in a liquid state through the cooling liquid delivery duct 91 towards the cooling liquid ports 61, 81. The liquid working fluid circulates in the annular cooling liquid chamber 67 and in the external cooling liquid chamber 83. The liquid working fluid is heated and partly evaporated by sensible heat and latent heat of vaporization removed from the shaft seal arrangement 37, and specifically from the stationary rings 48 and rotating rings 47. Vaporized working fluid leaking through the first additional shaft seal 69 is collected in the annular vapor venting chamber 75 and returned through the venting port 77 and the venting line 93 to the condenser 7. Working fluid still in the liquid phase is removed through the drainage port 79 and returned via drainage line 95 to the condenser 7.

Dry sealing gas is delivered to the dry gas seal 45 in a known manner, to prevent leakages of working fluid towards the environment.

The pressure of the cooling fluid in the annular cooling liquid chamber 67 is lower than the pressure of the dry sealing gas delivered to the opposing sealing surfaces 47S, 48S, such that dry sealing gas leaks through the interface between the opposing sealing surfaces 47S, 48S and flows in the annular cooling liquid chamber 67. Therefrom the dry sealing gas further leaks, together with the vaporized cooling liquid, in the annular vapor venting chamber 75, wherefrom the vaporized cooling liquid and the dry sealing gas are collectively vented through the vapor venting port 77. The dry sealing gas and the evaporated cooling liquid are returned to the condenser 7, wherein the non-condensable dry sealing gas can be separated from the working fluid and vented to the ambient or re-circulated in a dry sealing gas circuit.

Possible leakage of vaporized process fluid from the vapor venting chamber 75 through the second auxiliary shaft seal 71 is collected in the main working fluid flow circulating in the turboexpander 5 and is returned to the condenser 7.

Cooling of the shaft seal arrangement 37 is thus obtained without the need for separate cooling media, which might contaminate the working fluid circulating in the working fluid circuit 3. Efficient heat removal is provided by the liquid-to-vapor change of phase of the working fluid used as a cooling medium in the shaft seal arrangement 37. High heat exchange rates are obtained thanks to the latent heat of vaporization absorbed by the phase-changing working fluid circulating in the seal cooling system. The cooling liquid circuit and the dry sealing gas circuit do not need to be closed circuits, since the exhaust cooling fluid, both in the vapor state as well as in the liquid phase, is returned to the working fluid circuit 3 along with the leaking dry sealing gas.

The cooling liquid is made available at no additional cost, since it is simply split from the main working fluid flow, at the pressure and temperature conditions provided at the delivery side of the pump 9. The spent cooling flow (both in the vapor and liquid phase) is again condensed and pressurized by condenser 7 and pump 9, without the need for dedicated cooling and pressurizing circuits.

Figure 3:
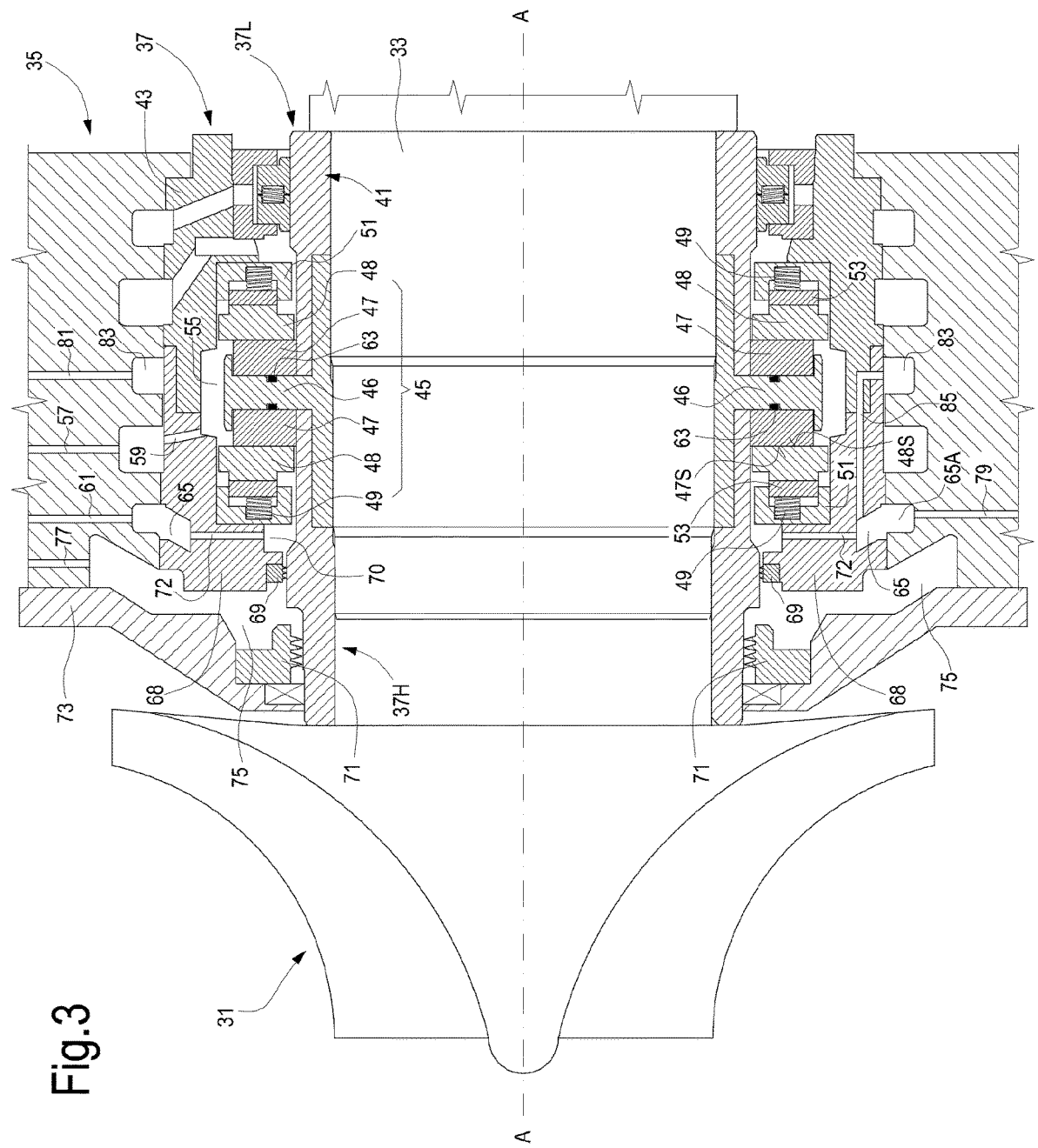
FIG. 3 illustrates a shaft seal arrangement, including a dry gas seal, according to a further exemplary embodiment.

FIG. 3 illustrates an alternative embodiment of a shaft seal arrangement 37. The same reference numbers designate the same components as already described in connection with FIG. 2. They will not be described again.

In the embodiment of FIG. 3 the annular cooling liquid chamber 67 is replaced by an annular cooling fluid chamber 70, forming a cooling fluid volume in heat exchange relationship with the dry gas seal 45. Gaseous cooling fluid, liquid cooling fluid or mixed gaseous and liquid cooling fluid is delivered in the annular cooling gas chamber 70 through at least one, or in an embodiment a plurality of cooling fluid ports 72, which can be circularly arranged around the axis A-A of the shaft 33. The inlet of the cooling fluid ports 72 are in communication with the groove 65. The outlet of the cooling fluid ports 72 are located in the annular cooling fluid chamber 70 and configured to generate cooling fluid jets, which are oriented such as to impinge against the outer surface of the rotor part 41 of the shaft seal arrangement 37.

The cross section of the cooling fluid ports 72 and the delivery pressure of the cooling fluid are such that the speed of the cooling fluid jets impinging against the rotor part 41 generate a heat barrier effect, preventing or limiting heat conduction through the rotor part 41 from the high-pressure, high-temperature end 37H of the shaft seal arrangement 37 towards the rotating rings 47 and the gaskets 63.

Additional cooling fluid ports, not shown, can be provided, which are oriented against the retainer 51, to remove heat therefrom by cooling fluid jets impinging against the retainer 51.

Also in this case working fluid from the working fluid circuit 3 can be used as cooling fluid. In some embodiments, the cooling fluid can be in gaseous or vapor state. In other embodiments, a partly gaseous and partly liquid cooling fluid, or else only liquid cooling fluid can be delivered through the cooling fluid ports 72, in which case latent vaporization heat absorbed by the liquid phase will cause evaporation of the liquid cooling fluid and provide more effective heat removal.

A drainage port 79 (not shown in FIG. 3) can be provided, in fluid communication with the annular cooling fluid chamber 70, to remove liquid cooling fluid therefrom.

Gaseous or evaporated cooling fluid can leak through the first additional shaft seal 69 and removed through the vapor venting port 77, along with dry sealing gas from the dry gas seal 45.

The fluids removed from the shaft seal arrangement 37 can be returned to the working fluid circuit 3 as described above.

The cooling fluid delivered to the cooling fluid ports 72 can be working fluid diverted from the working fluid circuit 3, e.g. downstream of the pump 9, in which case the cooling fluid will be provided in the liquid state. Alternatively, working fluid in the gas state can be diverted from the working fluid circuit 3 upstream of the turboexpander. A cooler can be provided, to cool the gaseous working fluid prior to delivery to the shaft seal arrangement.

According to the embodiments disclosed herein, heat-sensitive components of the dry gas seal 45 are protected against overheating by cooling fluid delivered to the shaft seal arrangement 37. Enhanced heat removal can be achieved by manufacturing components of the shaft seal arrangements, such as the rotary part 41 and the rings 47, 48, using materials having a high thermal conductivity.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What we claim is:

1. A shaft seal arrangement for a rotatable turbomachine shaft having a rotation axis, comprising:
   a rotor part that rotates during operation;
   a stationary part;
   a dry gas seal comprising at least one rotary element having a rotary sealing surface and arranged for rotation with the rotor part and at least one stationary element in a fixed relationship with the stationary part and having a stationary sealing surface, the rotary sealing surface and the stationary sealing surface being resiliently biased one against the other;
   a dry gas delivery path configured for delivering dry sealing gas between the stationary sealing surface and the rotary sealing surface;
   at least one cooling fluid volume comprising a cooling fluid chamber extending around the rotation axis of the shaft for receiving a cooling fluid and in heat exchange relationship with the dry gas seal; and
   a venting arrangement configured for collectively venting exhaust cooling fluid and dry sealing gas from the shaft seal arrangement.

2. The shaft seal arrangement of claim 1, wherein venting arrangement comprises a venting chamber, in fluid communication with the cooling volume and with the dry gas seal, collecting exhaust cooling fluid and dry sealing gas.

3. The shaft seal arrangement of claim 1, further comprising a liquid drainage arrangement, fluidly coupled to the cooling fluid volume, configured and arranged for draining cooling fluid in a liquid state from said cooling fluid volume.

4. The shaft seal arrangement of claim 1, wherein the venting arrangement is fluidly coupled to a venting chamber located between a first additional shaft seal and a second additional shaft seal.

5. The shaft seal arrangement of claim 1, wherein the cooling fluid chamber is further arranged adjacent the stationary element and opposite the rotary element of the dry gas seal.

6. The shaft seal arrangement of claim 5, wherein at least one cooling fluid port is arranged in the cooling fluid chamber and oriented to generate at least a cooling fluid jet impinging against the rotary part of the shaft seal arrangement.

7. The shaft seal arrangement of claim 6, wherein the at least one cooling fluid port comprises a plurality of cooling fluid ports provided in a circular arrangement around the axis of the shaft, and oriented to generate a plurality of cooling fluid jets impinging against the rotary part of the shaft seal arrangement.

8. The shaft seal arrangement of claim 6 wherein the shaft seal arrangement has a high-temperature axial end and a low-temperature axial end, and wherein the the at least one cooling fluid port is arranged between the dry gas seal and the high-temperature axial end of the shaft seal arrangement.

9. The shaft seal arrangement of claim 1, wherein the cooling fluid volume comprises an external cooling fluid chamber surrounding the stationary part of the shaft seal arrangement.

10. The shaft seal arrangement of claim 9 wherein the external cooling fluid chamber extends around the dry gas seal.

11. The shaft seal arrangement of claim 1, wherein the pressure of the dry sealing gas and of the cooling fluid are such that dry sealing gas flows from the dry gas seal towards the cooling fluid volume.

12. A turbomachine arrangement comprising:
   a turbomachine, wherein a working fluid is processed and comprised of: a casing, a shaft arranged for rotation in the casing, at least one impeller mounted on the shaft and a shaft seal arrangement according to claim 1; and
   a cooling fluid source fluidly coupled to the shaft seal arrangement and delivering cooling fluid thereto.

13. The turbomachine arrangement of claim 12, wherein the vapor venting arrangement and the liquid drainage arrangement of the shaft seal arrangement are in fluid communication with the cooling fluid source.

14. The turbomachine arrangement of claim 12, wherein the cooling fluid is working fluid processed by the turbomachine, or a fluid compatible therewith.

15. A power conversion system comprising:
   a working fluid circuit having a high pressure side and a low pressure side and configured to flow a working fluid therethrough;
   a cooler arranged and configured to remove heat from the working fluid in the low pressure side of the working fluid circuit;
   a pump or compressor fluidly coupled to the working fluid circuit between the low pressure side and the high pressure side thereof, configured to rise the pressure of the working fluid in the working fluid circuit;
   a heat exchanger configured to circulate the working fluid in heat exchange relationship with a hot fluid, to vaporize the working fluid; and
   a turboexpander fluidly coupled to the working fluid circuit and disposed between the high pressure side and the low pressure side thereof, configured to expand working fluid flowing therethrough and generating mechanical power therewith,
   wherein the turboexpander comprises: a casing, a shaft arranged for rotation in the casing, an impeller mounted on the shaft for rotation therewith and a shaft seal arrangement according to claim 1 to sealingly co-act with the shaft of the turboexpander.

16. The power conversion system of claim 15, wherein the shaft seal arrangement is fluidly coupled to the high pressure side of the working fluid circuit, downstream of the pump or compressor.

17. The power conversion system of claim 16, wherein the vapor venting arrangement and the drainage arrangement are fluidly coupled to the low pressure side of the working fluid circuit.

18. The power conversion system of claim 17, wherein the drainage arrangement and the vapor venting arrangement are fluidly coupled to the cooler.

* * * * *